United States Patent
Ruthruff et al.

(10) Patent No.: US 12,075,125 B2
(45) Date of Patent: Aug. 27, 2024

(54) PREDICTIVE DETECTION OF REAL-TIME AND FUTURE VIEWABILITY

(71) Applicant: Comscore, Inc., Reston, VA (US)

(72) Inventors: Joseph R. Ruthruff, Portland, OR (US); Michael J. Vinson, Oakland, CA (US)

(73) Assignee: Comscore, Inc., Reston, VA (US)

( * ) Notice: Subject to any disclaimer, the term of this patent is extended or adjusted under 35 U.S.C. 154(b) by 0 days.

(21) Appl. No.: 17/464,572

(22) Filed: Sep. 1, 2021

(65) Prior Publication Data

US 2022/0070535 A1 Mar. 3, 2022

Related U.S. Application Data

(60) Provisional application No. 62/706,655, filed on Sep. 1, 2020.

(51) Int. Cl.
*H04N 21/466* (2011.01)
*H04N 21/234* (2011.01)
*H04N 21/442* (2011.01)

(52) U.S. Cl.
CPC ..... *H04N 21/466* (2013.01); *H04N 21/23424* (2013.01); *H04N 21/44204* (2013.01); *H04N 21/4666* (2013.01)

(58) Field of Classification Search
CPC ....... H04N 21/44204; H04N 21/23424; H04N 21/466; H04N 21/4666
See application file for complete search history.

(56) References Cited

U.S. PATENT DOCUMENTS

| | | | |
|---|---|---|---|
| 2009/0320059 A1* | 12/2009 | Bolyukh | H04N 21/4667 725/32 |
| 2010/0114527 A1* | 5/2010 | Lee | H04N 21/23418 702/181 |
| 2012/0227064 A1* | 9/2012 | Neill | H04N 21/252 725/14 |
| 2012/0260280 A1* | 10/2012 | Harsh | H04N 21/252 725/21 |
| 2021/0281925 A1* | 9/2021 | Shaikh | H04N 21/44213 |

FOREIGN PATENT DOCUMENTS

CN 107920260 A * 4/2018

* cited by examiner

*Primary Examiner* — Jefferey F Harold
*Assistant Examiner* — Alexander Boyd
(74) *Attorney, Agent, or Firm* — Blank Rome LLP

(57) ABSTRACT

Predict whether active viewability is taking place and/or the likelihood that active viewability will be taking place in the future is described. Historical viewing data may be obtained. One or more probability distribution functions may be generated based on the historical viewing data. One or more survival curves may be determined based on the one or more probability distribution functions. Current viewing data may be obtained. Whether viewability is active in at least one of a current time or a specified future time may be predicted based on the one or more probability distribution functions and the current viewing data. Alternatively, this prediction may be performed via a machine learning model trained on the historical viewing data. Whether to perform a function may be determined based on the prediction.

15 Claims, 4 Drawing Sheets

PREDICTIVE DETECTION OF REAL-TIME AND FUTURE VIEWABILITY

CROSS REFERENCE TO RELATED APPLICATIONS

This application claims the benefit of U.S. Provisional Patent App. No. 62/706,655, filed Sep. 1, 2020, the disclosure of which is hereby incorporated by reference herein.

TECHNICAL FIELD

The present disclosure relates to predictive detection of real-time and future viewability and, more particularly, determining whether active viewability is taking place and the likelihood that active viewability will be taking place in the future.

BACKGROUND

When utilizing tune-level data, it is important to accurately assess and quantify the viewability that occurs during these reported tunes. Viewability refers to the portion of the tune that was actually viewed by one or more viewers. Devices that deliver signals to TVs, though, often do not know whether the connected TV's power-mode state is on or off. For TV, these devices are most often, but not always, set-top boxes (STBs) from a multichannel video programming distributor (MVPD) that offers TV subscribers a paid service. When that is the case, the devices that collect this tune-level viewing data may not actually capture true viewability because those devices could be sending a signal to a TV in a powered off state. This would serve to overstate viewing from the unadjusted tune-level data.

As the audience measurement industry evolves, data sources needed for measurement are moving to a larger scale in terms of numbers (e.g., billions) of events and information about individual events. There is thus a need to assess viewability for these events, such as output of an advertisement.

Further, much of the current audience measurement capability takes place retrospectively after data sources (such as tune level data) have been processed to compute metrics of interest. Known TV-off approaches retrospectively measure viewability after a full tuning event has been completed and reported, such as described in U.S. Pat. Nos. 8,863,166 and 9,009,749, the contents of which being incorporated herein by reference in their entireties.

Therefore, there is a need to determine how to assess whether active viewability is taking place, or the likelihood that active viewability is taking place, on one or more targeted devices. Similarly, there is a need to determine how to assess whether active viewability will be taking place, and the likelihood that active viewability will be taking place, at a point in the future.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes receiving historical viewing data, generating one or more probability distribution functions based on the historical viewing data, determining one or more survival curves based on the one or more probability distribution functions, receiving current viewing data, predicting, based on the one or more survival curves and the current viewing data, whether viewability is active in at least one of a current time or a specified future time, and determining whether to perform a function based on the prediction. Corresponding computer systems, apparatus, and computer programs recorded on one or more computer storage devices, can each be configured to perform the actions of the method.

Another general aspect includes obtaining historical viewing data, training a machine learning model based on the historical viewing data, receiving current viewing data, predicting, based on the machine learning model, whether viewability is active in at least one of a current time or a specified future time, determining whether to perform a function at the device based on the prediction, and determining an output of the prediction. Corresponding computer systems, apparatus, and computer programs recorded on one or more computer storage devices, can each be configured to perform the actions of the method.

BRIEF DESCRIPTION OF THE DRAWINGS

The details of particular implementations are set forth in the accompanying drawings and description below. Other features will be apparent from the following description, including the drawings and claims. The drawings, though, are for the purposes of illustration and description only and are not intended as a definition of the limits of the disclosure.

DETAILED DESCRIPTION

Figure 1:
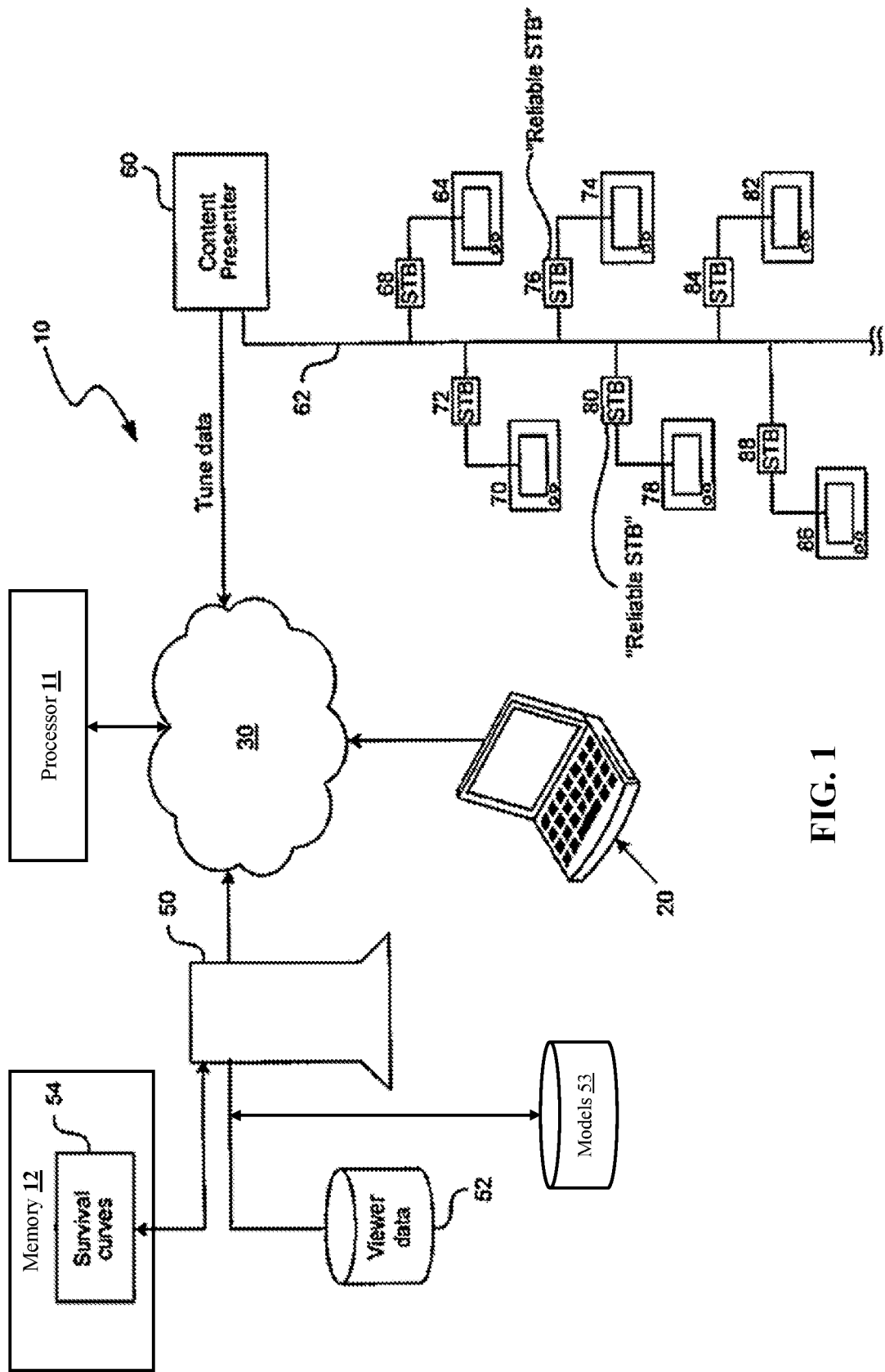
FIG. 1 illustrates a system for estimating viewership information.

Viewership associated with a tune may be overstated, for example, if a device that delivers signals to a TV (e.g., STB from a MVPD) is sending a signal to a TV in an off-power state and/or if a user has left the TV in an on-power state but is no longer actually viewing the tune (e.g., has walked away, fallen asleep, etc.). The techniques described herein facilitate the identification or prediction of these inorganic viewership sessions. Accordingly, the techniques described herein may be used to more accurately assess and/or quantify the viewability that occurs during reported tunes.

An MVPD and/or an advertiser may want to accurately assess and/or quantify the viewability that occurs during reported tunes. An MVPD and/or an advertiser may want to accurately assess and/or quantify the viewability that occurs during a reported tune to determine whether an advertisement (an "ad") should be output during the tune. For example, the MVPD and/or the advertiser may choose to output an advertisement during an advertisement insertion opportunity (e.g., an avail) in a tune if it is determined that a user likely to actually be viewing the tune at the time of the avail. The MVPD service may receive payment for the advertising buy of that particular spot. Conversely, the MVPD and/or the advertiser may choose not to output an advertisement during an avail in a tune if it is determined that a user is not likely to actually be viewing the tune at the time of the avail.

Additionally, an MVPD and/or an advertiser may want to accurately assess and/or quantify the viewability that occurs during a reported tune to determine which advertisement or type of advertisement should be output during an avail in the tune. For example, the MVPD and/or the advertiser may select a targeted, addressable advertisement for output during the avail in tune if it is determined that a user is actually viewing the tune at the time of the avail. Conversely, the MVPD and/or the advertiser may select a more generic, non-addressable advertisement for output during the tune if it is determined that a user is not actually viewing the tune at the time of the avail.

Addressable advertising is the ability to show different ads to different individuals and/or households while they are watching the same content. Addressable advertising may be used to target specific devices and/or specific households rather than a large group of anonymous third-party cookie pools. For example, a particular addressable, targeted ad may be selected for insertion into an avail in content output by a first device associated with a first household. A different addressable, targeted ad may be selected for insertion into the avail in the same content output by a second device associated with a second household.

An addressable ad may be selected for a particular device or household based on information associated with that device or household. The information may include, for example, demographic criteria associated with the user of the device or household, such as age(s), gender(s), occupation(s), years of home ownership, household size, income, geographic location, family size, media consumption habits, and combinations thereof. For example, addressable ads may be specifically served to households and/or devices that meet certain target criteria, such as those related to demographics (e.g., serving ads for diapers to households having children of age between 0 and 3 years). As another example, a particular addressable ad may be served to males between the ages of 25 to 35 with an annual income above $50,000. However, that same addressable ad may not be suitable to serve to females between the ages of 50-60 with an annual income below $50,000.

Some embodiments of the techniques described herein support audience measurement in real-time settings. For real-time ad placement, an ad server may need to evaluate and dynamically determine the devices on which to place a queued ad. For example, an ad server may need to determine, while a tuning is in the middle of an avail, whether to dynamically insert an ad into this avail. It is desirable for the ad server to optimize ad placement. For example, it is desirable for the ad server to dynamically insert an ad into this avail only if it is likely that active viewing is taking place (i.e., the TV monitor connected to the STB playback device is still on, and someone is in front of the TV watching.)

Accordingly, it may be desirable to determine, in real-time, the likelihood (e.g., a percentage likelihood) that active viewing is taking place at the time of the avail. The techniques described herein facilitate this determination. If it is determined to be likely that active viewing is taking place at the time of the avail, then the ad server may dynamically insert an ad, such as an addressable ad, into this avail. Conversely, if it is determined to be unlikely that active viewing is taking place at the time of the avail, then the ad server may not dynamically insert an ad into this avail. In some embodiments, if it is determined to be unlikely that active viewing is taking place at the time of the avail, then the ad server may nevertheless insert an ad into this avail, but it may be a more generic, non-addressable ad. In this manner, the techniques described herein help to optimize ad placement. When retroactive analysis takes place to determine whether the ad was actually viewed, the ad placement may be properly credited.

Some embodiments of the techniques described herein support audience measurement in predictive, future settings. For future ad placement, an ad server may need to evaluate and determine the devices on which to place an ad at some future time. For example, an ad server may need to determine, during a first telecast, whether to serve an ad into an upcoming avail in a second, later telecast. As another example, the ad server may need to determine whether to serve an ad into an upcoming avail in a current telecast. It is desirable for the ad server to optimize ad placement. For example, it is desirable for the ad server to insert an ad into a future avail only if it is likely that active viewing will be taking place at the time of the future avail (i.e., the TV monitor connected to the STB playback device will still be on, and someone will be in front of the TV watching.)

Accordingly, it may be desirable to determine the likelihood (e.g., a percentage likelihood) that active viewing will be taking place at the time of a future avail. The techniques described herein facilitate this determination. If it is determined to be likely that active viewing will be taking place at the time of the future avail, then the ad server may insert an ad, such as an addressable ad, into this future avail. Conversely, if it is determined to be unlikely that active viewing will be taking place at the time of the future avail, then the ad server may not insert an ad into this future avail. In some embodiments, if it is determined to be unlikely that active viewing will be taking place at the time of the future avail, then the ad server may nevertheless insert an ad into this future avail, but it may be a more generic, non-addressable ad. In some embodiments, if it is determined to be unlikely that active viewing will be taking place at the time of the future avail, then the ad server may instead insert an ad, such as an addressable ad, into an earlier avail, such as one in the current telecast (it may be determined that active viewing is likely to occur at the time of the earlier avail). In this manner, the techniques described herein help to optimize ad placement. When retroactive analysis takes place to determine whether the ad was actually viewed, the ad placement may be properly credited.

Some embodiments of the techniques described herein support audience measurement in both real-time and predictive future settings. For example, an ad server may be configured to determine in real-time, in the middle of an avail, the likelihood that active viewing is taking place at the time of the avail. The ad server may additionally be configured to determine the likelihood that active viewing will be taking place at the time of a future avail. The disclosed approach leverages TV-off survival curves or a similar probability model, such as a trained machine learning model, in a new calculation framework to make real-time prediction of active viewability taking place and/or of future viewability being still active after a predetermined period of time (e.g., a predetermined number of minutes, hours, seconds, or combination thereof).

As shown in FIG. 1, a viewing estimation system 10 includes a computing system 50 that is configured to receive tune data from one or more content presenters 60. In the embodiment shown, the content presenter 60 transmits program signals and can include internet providers, over-the-top (OTT) media providers, satellite television ("digital broadcast satellite") operators, local or regional broadcasters, and distributors of content over other transmission media. A number of subscribers view the program signals on televisions, video monitors, or other audio/video playback devices 64, 70, 74, 78, 82, 86, (each of which is simply referred to herein as a "video playback device"). Each of the video playback devices can be associated with a corresponding internal tuner or external set top box (STB) 68, 72, 76, 80, 84, 88 etc. that serves as an interface between the subscriber's video playback device and the cable 62 or other transmission means on which the television program or other audio-video content is transmitted.

In some embodiments, the set top boxes 68, 72, 76, 80, 84, 88 comprise cable television converters or satellite dish receivers. However, the set top boxes could also be digital video recorders (DVR), gaming consoles, mobile phones, laptops, or other electronic components which allow a user to tune to a desired audio/video stream. Broadly stated, the phrase "set top box" is used herein to refer to any device, component, module, or routine that enables tune data to be collected from an associated video playback device. Set top boxes may be stand-alone devices or set top box functionality may be incorporated into the video playback devices.

The content presenter 60 has the ability to receive signals indicative of tuning and other events from each of the set top boxes. The tuning events can represent each time a user interacts with the video device. For example, the tuning events may include such things as channel changes, recording or playing back programs that are transmitted to a set top box, and changes in playback, such as when a subscriber pauses, fast forwards or rewinds a program or otherwise varies its normal playback. In addition, the tuning events may indicate when a subscriber requests information from an interactive television subscription service. Data representative of the tuning events (e.g., tuning event data, tune data) may be collected by the content presenter 60. Such tune data is typically provided by an internal tuner or an external set top box that is associated with, or incorporated in, the video playback device.

The tuning event data is collected by the content presenter 60 from each of the set top boxes and is provided to the computing system 50 as tune data. Tune data is associated with a particular set top box based on, for example, an identifier in the tune data that identifies the set top box. The tune data can be transmitted over a computer communication link 30 such as a wired or wireless communication link, local area network, wide area network, the Internet, or a telephone link. While the tune data is depicted as being provided by the content presenter, in some embodiments the computing system 50 may receive the tune data from a data aggregator that interfaces with a number of content presenters. Moreover, in certain circumstances the computing system may receive the tune data directly from the set top boxes.

The computing system 50 analyzes the tune data to estimate viewership information. Authorized users 20, such as content producers, distributors, or advertisers, can access the computing system 50 via the computer communication link 30 or by other means to request reports about the viewership for a particular channel, program, or timeframe. The computing system 50 calculates the viewership information and can store the information in a data storage area 52, such as a database, to use when producing one or more reports that can be provided to the authorized users 20.

In many instances, a subscriber will leave their set top box continually powered on but will power off their video playback device when not in use. For example, a subscriber may leave their cable box powered on as a matter of habit even if they turn off their television. As another example, a subscriber may leave their set top box powered on to record a program when they are not home or are unable to watch the program in real time.

A large number of video playback devices do not provide a signal to the set top box that indicates when the video playback device is powered off. Therefore, for these video playback devices, it can appear in the tune data as if a subscriber is actually watching a program or channel but in fact the video playback device associated with a set top box is powered off. Additionally, for these video playback devices, it can appear in the tune data as if a subscriber is actually watching a program or channel but in fact the subscriber has left the set top box powered-on but has walked away from the TV, fallen asleep, etc. If the tune data associated with such set top boxes (e.g., inorganic viewership session data) is included in the data analyzed to determine viewership information, the result would overstate the number of viewers that are estimated to be watching particular programs or channels.

In an embodiment, the viewing estimation system 10 comprises a processor 11. The processor 11 may be configured to more accurately assess and/or quantify the viewability that occurs during reported tunes. The viewability prediction made by the processor 11 may be utilized to optimize ad placement. If the processor 11 determines that active viewing is likely to be taking place at the time of a current or future avail, then an ad server, such as an authorized user 20, may insert an ad, such as an addressable ad, into that avail. Conversely, if the processor 11 determines that active viewing is not likely to be taking place at the time of a current or future avail, then an ad server, such as an authorized user 20, may not insert an ad into that avail (or the ad server may serve an ad into an earlier avail).

To assess and/or quantify the viewability that occurs during reported tunes, the processor 11 may receive historical viewing data. The processor 11 may receive historical viewing data by retrieving the historical viewing data from a database, such as a database associated with a MVPD. The historical viewing data may include, for example, historical tune data. The historical tune data may include tune data associated with previously reported tunes, for which viewability has already been accurately quantified.

For example, this historical viewing data may indicate, for one or more previously reported tunes, each time a user interacted with the video device during that tune. For example, the historical viewing data may indicate, for one or more previously reported tunes, such things as channel changes, recording or playing back programs that were transmitted to a set top box, and changes in playback, such as when a subscriber paused, fast forwarded, or rewound a program or otherwise varied its normal playback. In addition, the historical viewing data may indicate accurate viewership information associated with each of the one or more previously reported tunes.

The processor 11 may determine one or more probability distribution functions based on the historical viewing data. The one or more probability distribution functions may include one or more probability distribution functions of the historical viewing data categorized by several customizable parameters. These parameters may include, for example, day of week, or weekday vs. weekend, hour of day, or daypart (e.g. prime time or non-prime time), length of viewing, network of viewing, and/or network genre (e.g., sports network, news network, movie networks, music networks, variety networks, etc.), type of television Service, which may be service level (e.g., Comcast Xfinity, Charter Spectrum, DIRECTV, Dish Network, etc.) or viewing stratum level (e.g., Direct Broadcast Satellite—DIRECTV and Dish Network—or Cable—e.g., Comcast and Charter). It should be appreciated that these parameters are merely examples, and the types of parameters and/or the number of parameters used can be customized in any suitable manner.

The processor 11 may determine one or more survival curves 54 based on the one or more probability distribution functions. The survival curves 54 may indicate a probability versus time that a video playback device is powered off after a tuning event. The survival curves 54 indicate the likelihood that a video playback device remains powered on at any time between two consecutive tuning events or conversely is powered off at any time between two consecutive tuning events. In some embodiments, different sets of survival curves 54 are constructed for each day of the week because the viewership patterns tend to change depending upon the day of the week and on weekends. Therefore, different survival curves 54 can be constructed for different times of the day, as well as for different days of the week and if desired, for different seasons or the like. Moreover, different survival curves 54 can be constructed for different channels (e.g., television network, cable network etc.) or types of programs (e.g., for sit-coms, news shows, movies, sporting events etc.). The determined survival curves 54 may be stored in a memory 12 of the computing system 50.

Each survival curve may be known to be generated from a probability distribution function of observed data categorized by several customizable parameters. For example, consider a potentially overstated tune event that was originally reported by a data collection device (e.g., STB) to be four hours in observed length. However, this four-hour tune should possibly be adjusted to a shorter but unknown event duration, e.g., to account for the true viewability that took place during the tune. In this example, the four-hour tune event may have a 99% chance of having a true viewability period of one minute, a 98% chance of having a true viewability period of two minutes, and so on.

Survival curves are known to be applied retrospectively, after the cessation of the tune event and subsequent data collection. However, a direct application of an individual survival curve that matches an individual tune event to assess viewability—where all information about that event is known retrospectively—is not possible in at-present or predictive-future scenarios. This is because a required dimension of the application of the survival curves—the final unadjusted reported length of the tune where viewability is to be assessed—is unknown.

In accordance with one embodiment of the disclosed technology, the processor 11 utilizes the survival curves 54 to identify tune data from set top boxes associated with video playback devices that are likely powered off. The survival curves 54 may additionally, or alternatively, be used by the processor 11 to identify tune data from set top boxes associated with video playback devices that are powered on, but a viewer is not actually consuming the content.

In an embodiment, the processor 11 utilizes the survival curves 54 to determine audience measurement in real-time settings. For real-time ad placement, an ad server, such as an authorized user 20, may need to evaluate and dynamically determine the devices on which to place a queued ad. For example, the ad server may need to determine, while a tuning is in the middle of an avail, whether to dynamically insert an ad into this avail. It is desirable for the ad server to optimize ad placement. For example, it is desirable for the ad server to dynamically insert an ad into this avail only if it is likely that active viewing is taking place (i.e., the TV monitor connected to the STB playback device is still on, and someone is in front of the TV watching.)

The processor 11 may determine, in real-time and based at least on the survival curves 54, the likelihood that active viewing is taking place at the time of the avail. If the processor 11 determines that it is likely that active viewing is taking place at the time of the avail, an ad server, such as an authorized user 20, may dynamically insert an ad, such as an addressable ad, into this avail. Conversely, if the processor 11 determines it to be unlikely that active viewing is taking place at the time of the avail, then the ad server may not dynamically insert an ad into this avail. In some embodiments, if the processor 11 determines it to be unlikely that active viewing is taking place at the time of the avail, then the ad server may nevertheless insert an ad into this avail, but it may be a more generic, non-addressable ad. In this manner, the techniques performed by the processor 11 help to optimize ad placement. When retroactive analysis takes place to determine whether the ad was actually viewed, the ad placement may be properly credited.

The processor 11 may additionally, or alternatively, determine, based at least on the survival curves 54, audience measurement in predictive, future settings. For future ad placement, an ad server, such as an authorized user 20, may need to evaluate and determine the devices on which to place an ad at some future time. For example, the ad server may need to determine, during a first telecast, whether to serve an ad into an upcoming avail in a second, later telecast.

If the processor 11 determines that it is likely that active viewing will be taking place at the time of a future avail, then the ad server may insert an ad, such as an addressable ad, into this future avail. Conversely, if the processor 11 determines that it is unlikely that active viewing will be taking place at the time of the future avail, then the ad server may not insert an ad into this future avail. In some embodiments, if the processor 11 determines that it is unlikely that active viewing will be taking place at the time of the future avail, then the ad server may nevertheless insert an ad into this future avail, but it may be a more generic, non-addressable ad. In some embodiments, if the processor 11 determines it to be unlikely that active viewing will be taking place at the time of the future avail, then the ad server may instead insert an ad, such as an addressable ad, into an earlier avail, such as one in the current telecast (the processor 11 may determine that active viewing is likely to occur/be occurring at the time of the earlier avail). In this manner, the techniques performed by the processor 11 help to optimize ad placement. When retroactive analysis takes place to determine whether the ad was actually viewed, the ad placement may be properly credited.

To determine audience measurement in real-time settings and/or predictive, future settings, the processor 11 may query the survival curves 54 based on one or more parameters (e.g., less than twelve parameters) of an active tune. The known parameters associated with the active tune may include, for example, day of week, or weekday vs. weekend, hour of day, or daypart (e.g. prime time or non-prime time), network of viewing, and/or network genre (e.g., sports network, news network, movie networks, music networks, variety networks, etc.), type of television Service, which may be service level (e.g., Comcast Xfinity, Charter Spectrum, DIRECTV, Dish Network, etc.) or viewing stratum level (e.g., Direct Broadcast Satellite—DIRECTV and Dish Network—or Cable—e.g., Comcast and Charter). It should be appreciated that these parameters are merely examples, and the types of known parameters and/or the number of parameters used can be customized in any suitable manner.

The processor 11 may query the survival curves 54 for all possible scenarios based on one or more remaining unknown parameters associated with the active tune. The unknown parameter(s) include length of viewing because the active tune and any associated viewability is currently in progress. Although the end time of the tune is unknown, a candidate range of discrete possible tune lengths can be determined by the processor 11 to support the predictive probability assessments. For example, if the ad server is asking for a tune that is currently four hours long, the processor 11 may assess probabilities between four hours thru six hours. The processor 11 may consider all the probability distribution functions matching all possible survival curves 54 that could be applicable to the active tune where at-present or predictive-future viewability is being assessed. The range of future tune lengths that could be consider is configurable/adjustable (e.g., all probabilities up to eight hours, nine hours, etc. could be considered).

The processor 11 may utilize an algorithm or Bayesian probability to assess the possible outcomes derived from the possible survival curves 54 and their probability distribution functions. From this algorithm, the processor 11 may determine a probabilistic likelihood that active viewability is taking place for an at-present assessment, or that viewability will still be taking place at a point in the future in a predictive-future use case. Alternatively, this probabilistic likelihood can be converted to a categorical "Yes"/"No" to assess viewability in place of a likelihood.

In some embodiments, the processor 11 may utilize a machine learning model 53 to provide categorical "Yes"/"No" assessments of present viewing or predictive viewing at a specific future point in time. The machine learning model 53 may be trained on a reliable set of device-level tune event data (e.g., from a STB) where there are accurate indicators of when viewability from a tune event indicated. (e.g., the TV and STB were powered off.) Indicators of the end of viewability may then be removed to create artificial tunes of how the tune event would have been reported without this indicator. This creates two sets of tunes: (1) an accurate tune known to have 100% viewability in its entirety; and (2) an overstated tune where for some portion of the event viewability took place, but where for the remaining portion of the event viewability did not take place. By training the machine learning model 53 on both sets of tunes, the machine learning model 53 may be able to reliably provide categorical "Yes"/"No" assessments of present viewing or predictive viewing at a specific future point in time.

Figure 2:
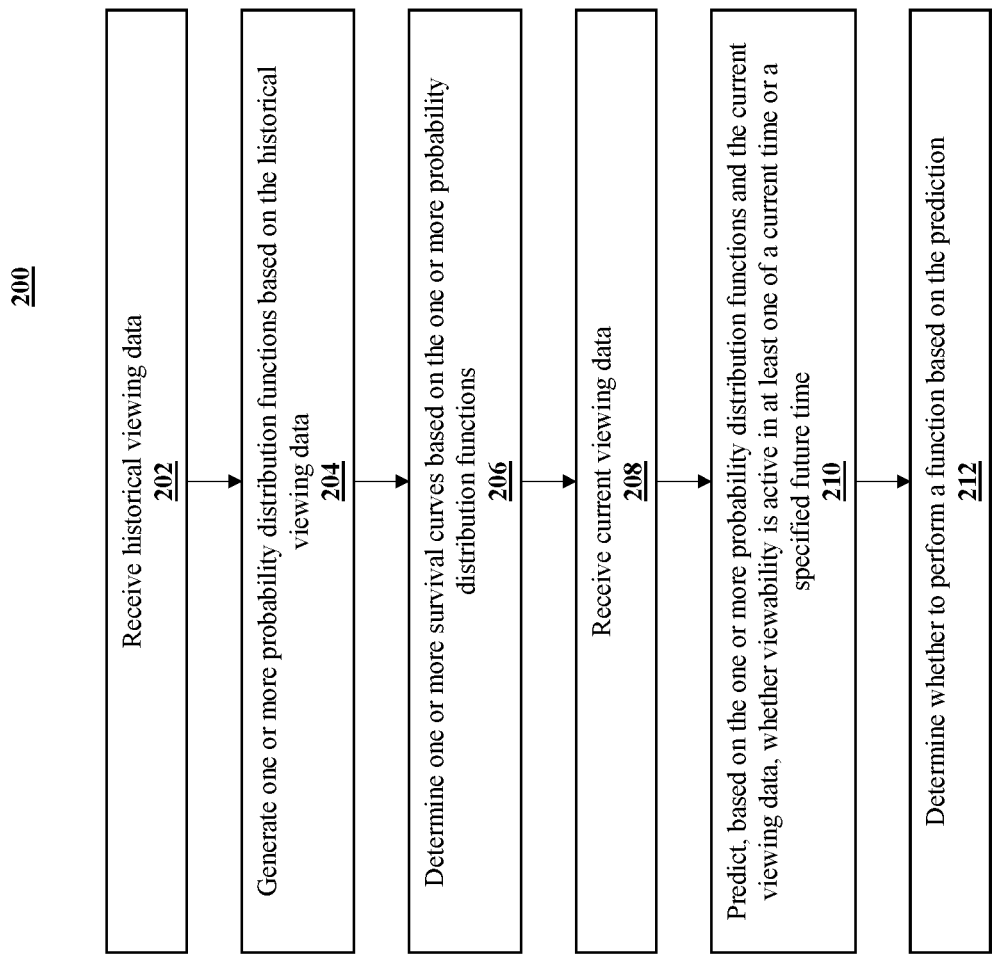
FIG. 2 illustrates a flow chart of an example method in accordance with one or more embodiments.
Figure 3:
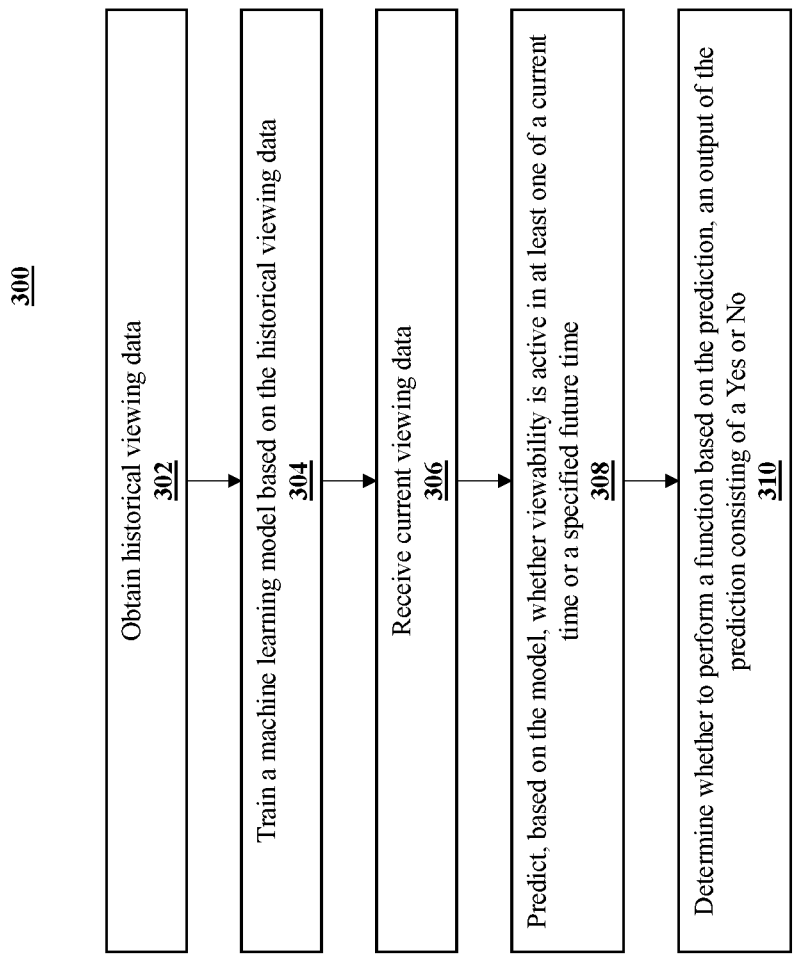
FIG. 3 illustrates a flow chart of an example method in accordance with one or more embodiments.

FIGS. 2-3 illustrate methods 200 and 300, respectively, for determining whether active viewability is taking place and the likelihood that active viewability will be taking place in the future, in accordance with one or more embodiments. Methods 200 and 300 may each be performed with a computer system comprising one or more computer processors, such as the processor 11, and/or other components. The processors are configured by machine readable instructions to execute computer program components. In some embodiments, methods 200 and 300 may each be accomplished with one or more additional operations not described, and/or without one or more of the operations discussed. Additionally, the order in which the operations of methods 200 and 300 are illustrated in FIGS. 2-3 and described below is not intended to be limiting.

At operation 202 of method 200, historical viewing data may be received. The historical viewing data may be retrieved from a database, such as a database associated with a MVPD. The historical viewing data may include, for example, historical tune data. The historical tune data may include tune data associated with previously reported tunes, for which viewability has already been accurately quantified. For example, this historical viewing data may indicate, for one or more previously reported tunes, each time a user interacted with the video device during that tune. The historical viewing data may indicate, for one or more previously reported tunes, such things as channel changes, recording or playing back programs that were transmitted to a set top box, and changes in playback, such as when a subscriber paused, fast forwarded, or rewound a program or otherwise varied its normal playback. In addition, the historical viewing data may indicate accurate viewership information associated with each of the one or more previously reported tunes.

At operation 204, one or more probability distribution functions may be generated based on the historical viewing data. The one or more probability distribution functions may include one or more probability distribution functions of the historical viewing data categorized by several customizable parameters. These parameters may include, for example, day of week, or weekday vs. weekend, hour of day, or daypart (e.g. prime time or non-prime time), length of viewing, network of viewing, and/or network genre (e.g., sports network, news network, movie networks, music networks, variety networks, etc.), type of television Service, which may be service level (e.g., Comcast Xfinity, Charter Spectrum, DIRECTV, Dish Network, etc.) or viewing stratum level (e.g., Direct Broadcast Satellite—DIRECTV and Dish Network—or Cable—e.g., Comcast and Charter). It should be appreciated that these parameters are merely examples, and the types of parameters and/or the number of parameters used can be customized in any suitable manner.

At operation 206, one or more survival curves, such as the survival curves 54, may be determined based on the one or more probability distribution functions. As discussed above, the survival curves may indicate a probability versus time that a video playback device is powered off after a tuning event. The survival curves estimate the likelihood that a video playback device remains powered on at any time between two consecutive tuning events or conversely is powered off at any time between two consecutive tuning events. In some embodiments, different sets of survival curves are constructed for each day of the week because the viewership patterns tend to change depending upon the day of the week and on weekends. Therefore, different survival curves can be constructed for different times of the day, as well as for different days of the week and if desired, for different seasons or the like. Moreover, different survival curves can be constructed for different channels (e.g., television network, cable network etc.) or types of programs (e.g., for sit-coms, news shows, movies, sporting events etc.).

The survival curves may be used to identify tune data from set top boxes associated with video playback devices that are likely powered off. At operation 208, current viewing data may be received. The current viewing data may indicate one or more known parameters of an active tune. The known parameters associated with the active tune may include, for example, day of week, or weekday vs. weekend, hour of day, or daypart (e.g. prime time or non-prime time), network of viewing, and/or network genre (e.g., sports network, news network, movie networks, music networks, variety networks, etc.), type of television Service, which may be service level (e.g., Comcast Xfinity, Charter Spectrum, DIRECTV, Dish Network, etc.) or viewing stratum level (e.g., Direct Broadcast Satellite—DIRECTV and Dish Network—or Cable—e.g., Comcast and Charter). It should be appreciated that these parameters are merely examples, and the types of known parameters and/or the number of parameters used can be customized in any suitable manner.

At operation 210, whether viewability is active in at least one of a current time or a specified future time may be predicted based on the survival curves (or one or more probability distribution functions) and the current viewing data. The survival curves may be queried based on one or more remaining unknown parameters of the active tune. The unknown parameter(s) include length of viewing because the active tune and any associated viewability is currently in progress. For example, all the probability distribution functions matching all possible survival curves that could be applicable to the active tune may be considered where at-present or predictive-future viewability is being assessed.

An algorithm or Bayesian probability may be utilized to assess the possible outcomes derived from the possible survival curves and their probability distribution functions. From this algorithm, a probabilistic likelihood may be determined. The probabilistic likelihood may indicate whether active viewability is taking place for an at-present assessment, or that viewability will still be taking place at a point in the future in a predictive-future use case. Alternatively, this probabilistic likelihood can be converted to a categorical "Yes"/"No" to assess viewability in place of a likelihood.

At operation 212 of method 200, whether to perform a function based on the prediction may be determined. The function can be to insert a targeted ad, to deploy a firmware update, or to execute other maintenance activities.

If the prediction indicates that it is likely that active viewing is taking place at the time of the avail, an ad server, such as an authorized user 20, may determine that an ad, such as an addressable ad, should be dynamically inserted into this avail. Conversely, if the prediction indicates that it is unlikely that active viewing is taking place at the time of the avail, then the ad server may determine that an ad should not be dynamically inserted into this avail. In some embodiments, the prediction indicates that it is unlikely that active viewing is taking place at the time of the avail, then the ad server may nevertheless determine that an ad should be inserted into this avail, but that the inserted ad should be a more generic, non-addressable ad.

If the prediction indicates that it is likely that active viewing will be taking place at the time of a future avail, then the ad server may determine that an ad, such as an addressable ad, should be inserted into this future avail. Conversely, if the prediction indicates that it is unlikely that active viewing will be taking place at the time of the future avail, then the ad server may determine not to insert an ad into this future avail. In some embodiments, if the prediction indicates that it is unlikely that active viewing will be taking place at the time of the future avail, then the ad server may nevertheless determine that an ad should be inserted into this future avail, but that the ad should be a more generic, non-addressable ad. In some embodiments, if the prediction indicates that it is unlikely that active viewing will be taking place at the time of the future avail, then the ad server may instead determine that an ad, such as an addressable ad, should be inserted into an earlier avail, such as one in the current telecast.

As discussed in detail above, the disclosed techniques include predicting viewability in real-time and future use cases for video playback devices and monitors (e.g., TVs receiving signals from an STB). For real-time placement of ads, a server may evaluate and determine the devices on which to place an ad for the purpose of maximizing viewability. Similar evaluations may be performed for upcoming advertising blocks that commence at a pre-determined point in the future. For these and other use cases, the disclosed approach predicts the probability of active or future viewability, e.g., to support inventory decisions and other capability.

The disclosed approach may utilize a combination of Bayesian probability and probability distribution functions generated from a truth set of historical data where viewability can be accurately quantified. When the supported system is queried for a predictive assessment of viewability, the probability framework may be used to calculate the likelihood that active viewability on a targeted video device (i) is taking place or (ii) will still take place at a specified point in the future. Known approaches only retrospectively quantify an estimate as to whether viewability was still taking place on a specified devise. By contrast, the disclosed approach supports (i) at-present assessment for real-time implementations and/or (ii) future assessment for implementations where a prediction is demanded a priori.

Inputs to the disclosed approach may include a dimensional probability framework, an active tune from a device to be queried for an active-viewability prediction, and one or more parameters of active tune that map to the probability framework. Outputs of the disclosed approach may include a likelihood that active viewing has terminated in a real-time use case and/or a likelihood that active viewing from the specified device has terminated at a specified point in the future.

In an embodiment, a machine learning model, such as the machine learning model 53, may be utilized to provide categorical "Yes"/"No" assessments of present viewing or predictive viewing at a specific future point in time. At operation 302 of method 300, historical viewing data may be obtained. The historical viewing data may be retrieved from a database, such as a database associated with a MVPD. The historical viewing data may include, for example, historical tune data. The historical tune data may include tune data associated with previously reported tunes, for which viewability has already been accurately quantified. For example, this historical viewing data may indicate, for one or more previously reported tunes, each time a user interacted with the video device during that tune. The historical viewing data may indicate, for one or more previously reported tunes, such things as channel changes, recording or playing back programs that were transmitted to a set top box, and changes in playback, such as when a subscriber paused, fast forwarded, or rewound a program or otherwise varied its normal playback. In addition, the historical viewing data may indicate accurate viewership information associated with each of the one or more previously reported tunes.

At operation 304, a machine learning model may be trained based on the historical viewing data. The machine learning model may be trained based on historical data where the true viewability is known. Indicators of the end of viewability may then be removed to create artificial tunes of how the tune event would have been reported without this indicator. This creates two sets of tunes: (1) an accurate tune known to have 100% viewability in its entirety; and (2) an overstated tune where for some portion of the event viewability took place, but where for the remaining portion of the event viewability did not take place. By training the machine learning model 53 on both sets of tunes, the machine learning model may be able to reliably provide categorical "Yes"/"No" assessments of present viewing or predictive viewing at a specific future point in time.

These events, where the truth of viewability is known, may be used by a machine learning model that automatically infers traits that are predictive and characteristic of viewability of tune events. When the model is trained and built, tune level events associated with current viewing data may be assessed by the model for a categorical Yes/No assessment. At operation 306, current viewing data may be received. The current viewing data may indicate one or more known parameters of an active tune. The known parameters associated with the active tune may include, for example, day of week, or weekday vs. weekend, hour of day, or daypart (e.g. prime time or non-prime time), network of viewing, and/or network genre (e.g., sports network, news network, movie networks, music networks, variety networks, etc.), type of television Service, which may be service level (e.g., Comcast Xfinity, Charter Spectrum, DIRECTV, Dish Network, etc.) or viewing stratum level (e.g., Direct Broadcast Satellite—DIRECTV and Dish Network—or Cable—e.g., Comcast and Charter). It should be appreciated that these parameters are merely examples, and the types of known parameters and/or the number of parameters used can be customized in any suitable manner.

At operation 308, whether viewability is active in at least one of a current time or a specified future time may be predicted via the trained machine learning model. At the time of a query to this system, one or more dimensions (e.g., the hour of viewing, the day of week, and the current length of the tune event) may be known. But the end time of the tune may be unknown. Disclosed embodiments may determine a candidate range of possible, discrete tune lengths to support the predictive probability assessments. For example, the ad server may be asking for a tune that is currently four hours long so the disclosed approach may assess probabilities between four through six hours (or optionally up to eight hours). In some embodiments, a range of future tune lengths may be configurable.

At operation 310, whether to perform a function at the device based on the prediction may be determined. An exemplary output of the prediction may consist of a Yes or No. In some embodiments, this assessment may be used to determine whether to insert a specific targeted ad. For example, such targeted ad may be inserted only at devices that still have active viewing to increase the likelihood that that ad is viewed. In these or other embodiments, the assessment may be used such that a partner gets paid more by advertisers because they will maximize viewability to the ads by only getting paid for ads people actually watch. Conversely, the partner may not get paid for the cases where the ad was not actively viewed (e.g., when the ad was sent to a device connected to a TV that was powered off).

Figure 4:
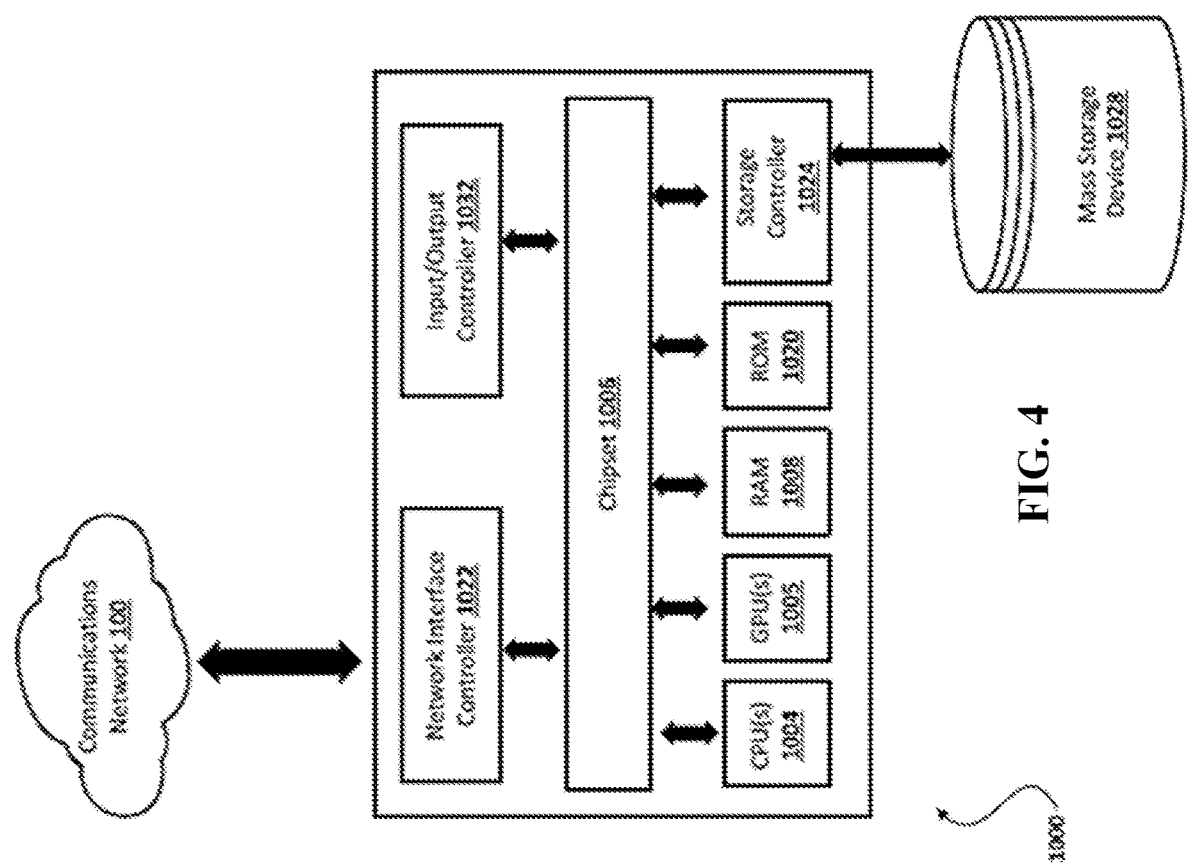
FIG. 4 is a block diagram of an example device.

FIG. 4 depicts an example computing device 1000 that may represent any of the various devices or entities illustrated in FIG. 1, including, for example, the authorized users 20, computing system 50, and/or content presenter 60. That is, the computing device 1000 shown in FIG. 4 may be any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the apparatus of FIG. 1 or the method described in relation to FIG. 2.

The computing device 1000 may include one or more central processing units (CPUs or "processors") 1004 that may operate in conjunction with a chipset 1006. The CPU(s) 1004 may be standard programmable processors that perform arithmetic and logical operations necessary for the operation of the computing device 1000. The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices. The chipset 1006 may provide an interface to a random access memory (RAM) 1008 used as the main memory in the computing device 1000. The chipset 1006 may provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems of the communications network 100. The chipset 1006 may include functionality for providing network connectivity through a network interface controller (NIC) 1022. A NIC 1022 may be capable of connecting the computing device 1000 to other computing nodes over the communications network 100. It should be appreciated that multiple NICs 1022 may be present in the computing device 1000, connecting the computing device to other types of networks and remote computer systems. The NIC may be configured to implement a wired local area network technology, such as IEEE 802.3 ("Ethernet") or the like. The NIC may also comprise any suitable wireless network interface controller capable of wirelessly connecting and communicating with other devices or computing nodes on the communications network 100. For example, the NIC 1022 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 1000 may be connected to a mass storage device 1028 that provides non-volatile storage (i.e., memory) for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on a mass storage device 1028. For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. The computing device 1000 may read information from the mass storage device 1028 by detecting the physical states or characteristics of one or more particular locations within the physical storage units.

In addition to the mass storage device 1028 described herein, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described herein. The computing device 1000 may have access to computer-readable storage media storing computer-executable instructions, which, when executed by the computing device 1000, may perform the methods described in relation to FIG. 2.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing device may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
    obtaining historical viewing data including a first set of viewing data, where a playback device is powered on and an internal tuner or an external set top box is powered on, and a second set of viewing data, where the playback device is powered off and the internal tuner or the external set top box is powered on;
    training a machine learning model based on the first set of viewing data and the second set of viewing data;
    receiving current viewing data;
    predicting, based on the machine learning model, and for a current time, date, and length of tune event or specified future time, date, and length of tune event, whether the playback device, connected to the internal tuner or the external set top box that is powered on, is powered on or is powered off; and
    determining, based on the prediction of whether the playback device is powered on or is powered off, whether to perform a function.

2. The method of claim 1, wherein determining whether to perform the function comprises determining to insert a targeted advertisement.

3. The method of claim 1, wherein determining whether to perform the function comprises determining whether to deploy a firmware update or to execute other maintenance activities.

4. The method of claim 1, wherein the historical viewing data indicates at least one of a channel change, a playback of a program, a recording of a program, or a change in playback of a program.

5. The method of claim 1, wherein the current viewing data indicates at least one of a day, a daypart, a network, a network genre, or a type of content distribution service.

6. An apparatus comprising:
    one or more processors; and
    memory storing instructions that, when executed by the one or more processors, cause the apparatus to:
        obtain historical viewing data including a first set of viewing data, where a playback device is powered on and an internal tuner or an external set top box is powered on, and a second set of viewing data, where the playback device is powered off and the internal tuner or the external set top box is powered on;
        train a machine learning model based on the first set of viewing data and the second set of viewing data;
        receive current viewing data;
        predict, based on the machine learning model, and for a current time, date, and length of tune event or specified future time, date, and length of tune event, whether the playback device, connected to the internal tuner or the external set top box that is powered on, is powered on or is powered off, and
        determine, based on the prediction of whether the playback device is powered on or is powered off, whether to perform a function.

7. The apparatus of claim 6, wherein the instructions, when executed, cause the apparatus to determine whether to perform the function by determining whether to insert a targeted advertisement.

8. The apparatus of claim 6, wherein the instructions, when executed, cause the apparatus to determine whether to perform the function by determining whether to deploy a firmware update or to execute other maintenance activities.

9. The apparatus of claim 6, wherein the historical viewing data indicates at least one of a channel change, a playback of a program, a recording of a program, or a change in playback of a program.

10. The apparatus of claim 6, wherein the current viewing data indicates at least one of a day, a daypart, a network, a network genre, or a type of content distribution service.

11. A non-transitory computer-readable medium comprising computer-executable instructions which, when executed by at least one processor, cause the at least one processor to:
    obtain historical viewing data including a first set of viewing data, where a playback device is powered on and an internal tuner or an external set top box is powered on, and a second set of viewing data, where the playback device is powered off and the internal tuner or the external set top box is powered on;
    train a machine learning model based on the first set of viewing data and the second set of viewing data;
    receive current viewing data;
    predict, based on the machine learning model, and for a current time, date, and length of tune event or specified future time, date, and length of tune event, whether the playback device, connected to the internal tuner or the external set top box that is powered on, is powered on or is powered off; and
    determine, based on the prediction of whether the playback device is powered on or is powered off, whether to perform a function.

12. The non-transitory computer-readable medium of claim 11, wherein the instructions, when executed, cause the at least one processor to determine whether to perform the function by determining whether to insert a targeted advertisement.

13. The non-transitory computer-readable medium of claim 11, wherein the instructions, when executed, cause the at least one processor to determine whether to perform the function by determining whether to deploy a firmware update or to execute other maintenance activities.

14. The non-transitory computer-readable medium of claim 11, wherein the historical viewing data indicates at least one of a channel change, a playback of a program, a recording of a program, or a change in playback of a program.

15. The non-transitory computer-readable medium of claim 11, wherein the current viewing data indicates at least one of a day, a daypart, a network, a network genre, or a type of content distribution service.

* * * * *